May 30, 1933.   F. W. HOCHSTETTER   1,911,279
METHOD OF MAKING CELLULOSIC CARBON AND PRODUCT THEREOF
Filed Feb. 17, 1931
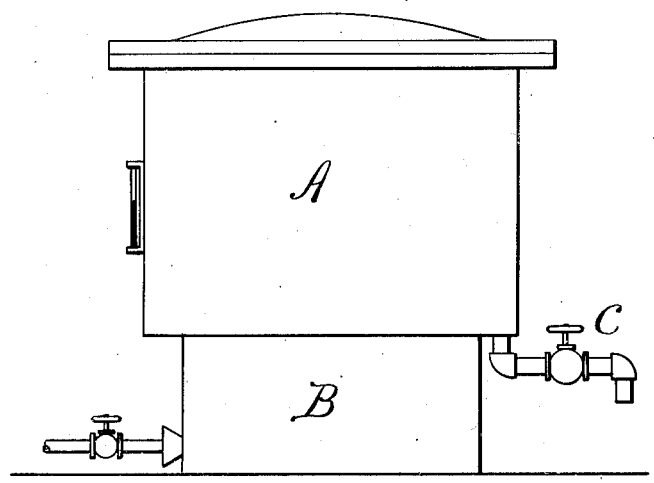
INVENTOR.
Frederick W. Hochstetter
BY
ATTORNEY Patented May 30, 1933

1,911,279

UNITED STATES PATENT OFFICE

FREDERICK W. HOCHSTETTER, OF PITTSBURGH, PENNSYLVANIA

METHOD OF MAKING CELLULOSIC CARBON AND PRODUCT THEREOF

Application filed February 17, 1931. Serial No. 516,398.

My invention consists of an improvement in cellulosic carbon and the method of making it. It has for its object to produce such a carbon for use in the arts from otherwise waste or cheap raw material by the method hereinafter described.

While the operation or treatment is not dependent on the use of any special or complicated apparatus, I show herein a diagrammatic representation of a digester or other suitable vessel subject to a variable heat, and otherwise suitable, as will be apparent to those skilled in the art.

In carrying out my invention I utilize any waste or otherwise preferably cheap and amply available raw material such as paper, rags, wood, sawdust, vegetable fibre, or the like containing or mainly constituted of cellulose and/or cellulosic components.

A suitable mass or quantity of such cellulosic components or equivalents thereof is first charged into a vessel A provided with a heat imparting furnace or suitable burner B of any available type. It will be understood that the heat is regulable and the apparatus is supplied with proper filling, emptying, temperature indicating, or other necessary operative elements etc. and that the vessel A is provided with such necessary mechanism as will facilitate its action as a digester, for the purpose in view.

The mass of raw material composing the charge of cellulosic components is charged into the vessel A with an ample supply of water, in the form of a fluid mash. To this I also add a water solution of sodium hydroxide of a strength to give the desired reaction. The mass is gradually raised to a temperature of about 180° F. with accompanying agitation by means of the usual stirring and disintegrating devices usually employed in digesters or pulp making machinery.

When the components are partly disintegrated all of the water is dispensed with, as by a withdrawal connection C, and the remaining pulp or mass is completely dehydrated by maintenance of the heat. After a limited further digesting action the temperature is then gradually reduced to about 140° F., and the mass is then subjected to the action of an aqueous solution containing salt, preferably compounded from organic and inorganic substances.

Such solution is used for the purpose of imparting to the material heat resisting characteristics so as to prevent it from being converted into ash during the process of dehydration and charring. While other ingredients or chemicals may be used for such heat resisting treatment, I have had good results and prefer to use the following:

| | Percent |
|---|---|
| Liquid ammonia | 5 |
| Ammonium sulphate | 55 |
| Ammonium carbonate | 25 |
| Boric acid | 10 |
| Aluminum sulphate | 5 |

These are successively dissolved in water in the order given and with sufficient water for the whole volume, as say ten gallons of water; and finally thoroughly mixed with the previously superhydrated material. The temperature of the entire mass is then gradually increased to 180° F. and again subjected to constant agitation for digesting for about twenty minutes.

In this manner the previously dehydrated mass is thus completely saturated with the above saline solution and is again subjected to dehydration by application of moderate heat, either from the heater or by radiation from the container. By such action the temperature of the mass is slowly but gradually increased until the kindling point of the product is reached, when it finally becomes charred and is the cellulosic carbon product.

The particular advantage of the latter step of the process is that the gradual and thorough drying of the treated cellulose with final carbonization produces a completely brittle product that may be readily ground into comparatively fine powder-like cellulose. It is thus possible to produce a carbonized product of substantially uniform carbonization characteristics and at considerably lower temperatures than are necessary in other processes practiced in the manufacture of charcoal or bone black. The product of my improved process possesses high heat resisting characteristics with regular sizes fibres, so that when subjected to heat in the final process of charring there is no tendency of premature charring of finer or smaller fibres or particles or of their internal cells. The resulting carbon is thus of unvarying and stable resistance and with a very low ash content.

The finished product thus produced is pure cellulosic carbon, and is possessed of functions and characteristics of great and unusual value in providing both electrical and heat resistance. I have found that in using the cellulosic carbon of my invention for either fixed or variable electric resistors for controlling electric currents in accordance with predetermined requirements, a more accurate control may be accomplished. Also, that only a relatively small amount of the product is required compared with other standard resistance substances at present used in the arts.

High voltage of the A.C. and D.C. types of current may be easily and accurately varied by using the cellulosic carbon of this invention down to 0° F. without any superheating of either the cellulosic carbon or the container.

In actual practice, using cellulosic carbon produced in accordance with my invention, the efficient results obtained when applied for controlling electrical circuits in both A.C. and D.C. currents is not obtained by any known methods of current control.

I also find perfect results in radio receiving by the use of resistors both of the variable and fixed types produced from such cellulosic carbon, and entirely overcome all hum sounds from current which are usually encountered in standard radio equipment.

The product of this invention may also be used in practically all of the electrical arts where variation of voltages etc. are required, as well as in others wherever it may be found useful. Neither is the invention limited to production in connection with the specified illustrative formula of chemical elements or ingredients as other recognized substitutions or equivalents thereof may be used.

The invention may also be utilized by those skilled in the art by varying the specified temperatures or their time of maintenance, or proportions of the saline solution with relation to the particular raw material used as a base, or otherwise as to changes in kind or quantity of material, or otherwise, by the skilled operator.

What I claim is:

1. The method of making cellulosic carbon consisting in subjecting a mass of suitable raw material in water and sodium hydroxide to heat while agitating the mass, effecting dehydration thereof, digesting the mass and reducing its temperature, then adding an aqueous saline solution and increasing the temperature of the mass with accompanying agitation, and finally dehydrating and heating the mass to effect carbonization.

2. The method of making cellulosic carbon consisting in subjecting a mass of suitable raw material in water and sodium hydroxide to heat while agitating the mass, effecting dehydration thereof, digesting the mass and reducing its temperature, then adding a solution of liquid ammonia, ammonium sulphate, ammonium carbonate, boric acid, aluminum sulphate, and water, then increasing the temperature of the mass with accompanying agitation and digestion, and finally dehydrating and heating the mass to carbonization to produce the finished product.

3. In the method of making cellulosic carbon as described, first charging a mass of raw cellular material and water solution of sodium hydroxide in a container, heating the mass to about 180° F. with accompanying agitation until substantially dry, then gradually reducing the temperature with accompanying digestion, then adding a solution of reactive salts and water and increasing the temperature of the mass with accompanying agitation until the mass is finally dry and carbonized resulting in the final product.

4. The method of making cellulosic carbon consisting in subjecting a mass of suitable cellular raw material in water containing sodium hydroxide to heat while agitating the mass, effecting dehydration thereof, digesting the mass and reducing its temperature, then adding an aqueous saline solution and increasing the temperature of the mass with accompanying agitation, and finally dehydrating the mass and subjecting it to carbonizing heat.

5. The herein described finally dried cellulosic carbon derived from cellular raw material intimately associated with water, sodium hydroxide, and a saline solution.

In testimony whereof I hereunto affix my signature.

FREDERICK W. HOCHSTETTER.